USO10391882B2

(12) United States Patent
Aschwer et al.

(10) Patent No.: US 10,391,882 B2
(45) Date of Patent: Aug. 27, 2019

(54) CELL-CONTACTING SYSTEM FOR A MOTOR-VEHICLE BATTERY MODULE AND A MOTOR-VEHICLE BATTERY MODULE

(71) Applicant: Bayerische Motoren Werke Aktiengesellschaft, Munich (DE)

(72) Inventors: Jan Aschwer, Putzbrunn (DE); Alexander Muck, Munich (DE); Tuncay Idikurt, Munich (DE); Daniel Scherer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/427,270

(22) Filed: Feb. 8, 2017

(65) Prior Publication Data

US 2017/0144566 A1 May 25, 2017

Related U.S. Application Data

(63) Continuation of application No. PCT/EP2015/068718, filed on Aug. 14, 2015.

(30) Foreign Application Priority Data

Sep. 23, 2014 (DE) .................. 10 2014 219 178

(51) Int. Cl.
*B60L 11/18* (2006.01)
*H01M 2/10* (2006.01)
(Continued)

(52) U.S. Cl.
CPC ........... *B60L 11/1877* (2013.01); *B60L 50/66* (2019.02); *B60L 58/21* (2019.02); *H01M 2/1077* (2013.01);
(Continued)

(58) Field of Classification Search
None
See application file for complete search history.

(56) References Cited

U.S. PATENT DOCUMENTS

2012/0315566 A1 12/2012 Schaefer et al.
2013/0244499 A1* 9/2013 Heck ............... H01R 13/00
439/582
(Continued)

FOREIGN PATENT DOCUMENTS

CN 103311487 A 9/2013
CN 103918105 A 7/2014
(Continued)

OTHER PUBLICATIONS

International Search Report (PCT/ISA/210) issued in PCT Application No. PCT/EP2015/068718 dated Oct. 16, 2015 with English translation (Four (4) pages).
(Continued)

*Primary Examiner* — Christopher P Domone
(74) *Attorney, Agent, or Firm* — Crowell & Moring LLP

(57) ABSTRACT

A cell-contacting system for a motor-vehicle battery module, in particular for an electric or hybrid vehicle includes an, in particular, substantially plate-shaped support structure and multiple separate contact elements, each of which is used to contact two adjacent battery cells of the motor-vehicle battery module. The contact elements are arranged next to one another in a first row, each element being fixed at one side to the support structure.

20 Claims, 2 Drawing Sheets

(51) Int. Cl.
    *H01M 2/20*     (2006.01)
    *B60L 58/21*     (2019.01)
    *B60L 50/60*     (2019.01)
    *H01M 2/02*     (2006.01)
    *H01R 11/28*     (2006.01)

(52) U.S. Cl.
    CPC .......... *H01M 2/206* (2013.01); *H01M 2/0217* (2013.01); *H01M 2220/20* (2013.01); *H01R 11/288* (2013.01); *Y02T 10/7005* (2013.01); *Y02T 10/7061* (2013.01); *Y10S 903/907* (2013.01)

(56) References Cited

U.S. PATENT DOCUMENTS

| | | | | |
|---|---|---|---|---|
| 2014/0322589 A1* | 10/2014 | Goesmann | .......... | B60L 11/1864 429/156 |
| 2015/0155533 A1* | 6/2015 | Kim | .......... | H01M 2/30 429/99 |
| 2017/0133656 A1* | 5/2017 | Roemer | .......... | H01M 2/1077 |

FOREIGN PATENT DOCUMENTS

| | | |
|---|---|---|
| CN | 103947007 A | 7/2014 |
| DE | 10 2010 005 017 A1 | 7/2011 |
| DE | 10 2012 005 120 A1 | 9/2013 |
| DE | 10 2012 218 500 A1 | 4/2014 |
| EP | 2639857 A1 | 9/2013 |
| JP | 2010-97722 A | 4/2010 |
| WO | WO 2012/011237 A1 | 1/2012 |
| WO | WO2013075840 * | 5/2013 |

OTHER PUBLICATIONS

German-language Written Opinion (PCT/ISA/237) issued in PCT Application No. PCT/EP2015/068718 dated Oct. 16, 2015 (Six (6) pages).

German-language Search Report issued in counterpart German Application No. 10 2014 219 178.5 dated Jun. 25, 2015 with partial English translation (Twelve (12) pages).

Chinese Office Action issued in Chinese counterpart application No. 201580033961.5 dated Aug. 28, 2018, with English translation (Sixteen (16) pages).

Chinese Office Action issued in Chinese counterpart application No. 201580033961.5 dated Apr. 9, 2019, with English translation (Seventeen (17) pages).

* cited by examiner

CELL-CONTACTING SYSTEM FOR A MOTOR-VEHICLE BATTERY MODULE AND A MOTOR-VEHICLE BATTERY MODULE

CROSS REFERENCE TO RELATED APPLICATIONS

This application is a continuation of PCT International Application No. PCT/EP2015/068718, filed Aug. 14, 2015, which claims priority under 35 U.S.C. § 119 from German Patent Application No. 10 2014 219 178.5, filed Sep. 23, 2014, the entire disclosures of which are herein expressly incorporated by reference.

BACKGROUND AND SUMMARY OF THE INVENTION

The invention relates to a cell contact-making system of a motor-vehicle battery module, in particular for an electric or hybrid vehicle, and also to a motor-vehicle battery module.

Electric or hybrid vehicles are increasingly in demand by consumers since people have become more ecologically aware. These motor vehicles have at least one motor-vehicle battery module, which provides the electrical drive energy for the motor vehicle, as the only drive or as an additional drive. A motor-vehicle battery module usually has a plurality of battery cells which can be, in particular, of prismatic or prism-like design. During production, the battery cells are compressed with distance control and force monitoring, so that they form a battery pack which is held in its defined form by a circumferential frame. In this case, the frame surrounds the battery pack at its sides.

In order to make contact with the individual battery cells and in order to interconnect the battery cells in series, a cell contact-making system is typically provided. The cell contact-making system is arranged on the battery pack in order to make contact with the individual battery cells. The cell contact-making systems known from the prior art have a support board which is of frame-like design and has cutouts in the region of which contact elements of the cell contact-making system are provided in order to make contact with the individual battery cells. The individual contact elements are fastened to the support board, so that the support board is connected to the motor-vehicle battery module by way of the connection of the contact elements to the battery cells. The contact elements are fastened to the support board by way of two of their opposite sides in the region of the cutouts in order to ensure good contact is made with the battery cells, this in turn ensuring good connection of the support board to the motor-vehicle battery module.

Furthermore, the support board typically supports a separate cable channel by which the individual contact elements of the cell contact-making system are electrically coupled to one another in order to form the series circuit. After contact is made with the individual battery cells and said battery cells are interconnected, the cell contact-making system is usually closed by a cover in order to provide electric-shock protection. In this case, the cover is coupled to the support board of the cell contact-making system.

One disadvantage of the known cell contact-making systems and also the known motor-vehicle battery modules has been found to be that the cover and the cell contact-making system are coupled to one another, as a result of which there is a complicated and multi-layered tolerance chain. In this case, the fit of the cover is dependent on the manufacturing tolerances of the cell contact-making system. Furthermore, the motor-vehicle battery module has a correspondingly high number of components, as a result of which, amongst other things, the weight is high and the production process lasts longer, this resulting in higher production costs. Furthermore, it has been found to be disadvantageous that the contact elements are mounted in a fixed manner, as a result of which they cannot yield to an expansion of the battery cells.

The object of the invention is to provide a cell contact-making system, and also a motor-vehicle battery module, which allows simple coupling of the battery cells and, in addition, may be realized in a cost-effective manner.

According to the invention, the object is achieved by a cell contact-making system of a motor-vehicle battery module, in particular for an electric or hybrid vehicle, wherein the cell contact-making system has an, in particular substantially plate-like, support structure and a plurality of separate contact elements, each of which is used to contact two adjacent battery cells of the motor-vehicle battery module. The contact elements are arranged next to one another in a first row, each element being fastened at one side to the support structure.

The basic idea of the invention is to form the cell contact-making system in such a way that the contact elements are at least partially movably mounted, so that the contact elements have a certain degree of play at least in one direction. This is realized by fastening the contact elements on one side. Since they are not fixed on the side opposite the one-sided fastening, they project freely and therefore are movable in principle. Therefore, the contact elements can yield in line with an expansion of the battery cells.

One aspect of the invention provides that the contact elements protrude beyond the edge of the support structure, in particular in such a way that the total width of the support structure with the contact elements fastened to it corresponds to the width of a battery pack which is formed by the battery cells of the motor-vehicle battery module. This creates a compact and lightweight cell contact-making system. This improves the ability to mount the cell contact-making system on the motor-vehicle battery module. Furthermore, the frame which is usually provided can be dispensed with, as a result of which the weight can be reduced and at least one production step can be saved.

In particular, the support structure has a web, which is arranged substantially centrally and runs along the first row, and supporting sections which protrude laterally in relation to the battery cells from said web and which form the edge of the support structure and to which the contact elements are fastened. The support structure of the cell contact-making system is accordingly of particularly simple construction since only the centrally arranged web, which provides the rigidity of the support structure, is provided as a central element. The centrally arranged web can support the cables and also serve to mount the contact elements. The otherwise separate cable channel can be dispensed with, as a result of which the number of components of the cell contact-making system and the weight of said cell contact-making system are reduced.

Furthermore, each supporting section can have a fastening tab to which the respective contact element is fastened. The fastening tabs are arranged on the edge of the support structure where the contact elements are fastened on one side. The fastening tabs can increase the flexibility since they are designed in a bendable manner relative to the substantially rigid web which is arranged centrally, so that the contact elements have even more play.

According to a further aspect of the invention, further contact elements are arranged next to one another in a second row. The further contact elements are provided on a side of the support structure which is opposite the first row, so that contact elements for making contact with in each case two adjacent battery cells of the motor-vehicle battery module are positioned on both sides of the support structure, in particular wherein the contact elements of the first and of the second row are arranged offset in relation to one another by half the width of a contact element in the row direction. The second row likewise extends substantially parallel to the centrally arranged web. Furthermore, the prismatic battery cells, in particular, are interconnected in series as a result since the contact elements which are positioned in such a way that they connect the individual battery cells of the battery pack in series are arranged on the respective end sides of the battery cells.

The object of the invention is further achieved by a motor-vehicle battery module, in particular for an electric or a hybrid vehicle, comprising at least two, in particular prismatic, battery cells which are situated flat next to one another and form a battery pack. The module includes a module frame which circumferentially surrounds the at least two battery cells, and also including a cell contact-making system of the above-described type. The motor-vehicle battery module can be mounted in a simple manner since the cell contact-making system can be fitted to the motor-vehicle battery module more easily on account of the lower number of components and the compact design. Furthermore, fewer tools have to be used, as a result of which production is generally simplified.

In particular, a cover is provided. The cover covers the cell contact-making system and is fastened, for example, to the module frame. The cover constitutes an electric-shock protection device for the cell contact-making system. Since the cover is fastened to the module frame, the cover is decoupled from the cell contact-making system, as a result of which the tolerance chain is also decoupled. Therefore, the tolerance chain is interrupted earlier.

Furthermore, the object is achieved by a motor-vehicle battery module, in particular for an electric or a hybrid vehicle, comprising at least two, in particular prismatic, battery cells which are situated flat next to one another and form a battery pack. The module includes a module frame which circumferentially surrounds the at least two battery cells. The module further includes a cell contact-making system which electrically connects the battery cells of the motor-vehicle battery module to one another, and also includes a cover which is separate from the cell contact-making system, covers the cell contact-making system and is fastened to the module frame, in particular is latched to the module frame. The cover is decoupled from the cell contact-making system, so that the tolerance chain is decoupled. Accordingly, the tolerances of the cell contact-making system do not have any influence on the fit of the cover, as a result of which the complexity of the motor-vehicle battery module is correspondingly reduced.

According to a further aspect of the invention, the module frame has two pressure plates which bear against opposite sides of the battery pack, and also two tie rods which are connected to the two pressure plates, wherein the cover is fastened to at least one pressure plate and/or to at least one tie rod. As a result, the cover can be mounted on the module frame in a particularly simple manner since the cover is coupled directly to one or all of the elements of the module frame. In particular, the cover can be latched, as a result of which mounting can once again be performed in a simpler and more rapid manner since the connection is formed when the cover is pressed down.

Furthermore, the cover can be in the form of a thermoformed cover and/or can be formed from an electrically insulating material. The high-voltage insulation of the motor-vehicle battery module can be formed or supplemented in this way. Furthermore, the cover can have a small wall thickness, wherein it is produced, in particular, from a plastic, so that weight can further be saved. In general, the air gaps and creepage distances of the insulation can in this way be maintained in a less complex manner owing to the insulating cover which is fitted directly to the insulating module frame.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
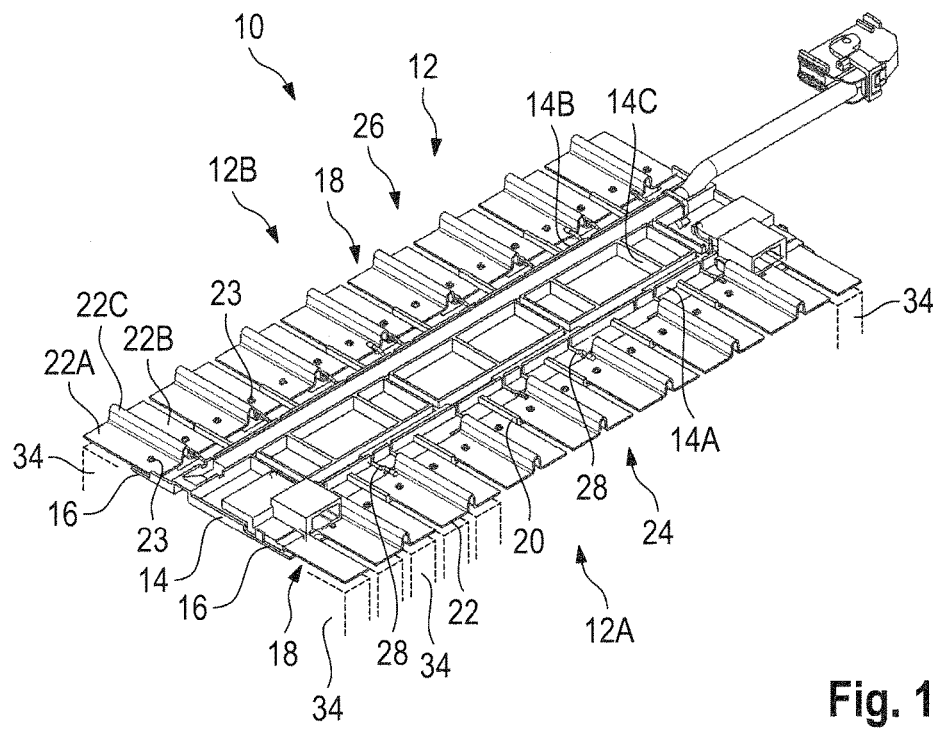
FIG. 1 is a perspective view of the cell contact-making system according to an embodiment of the invention.
Figure 2:
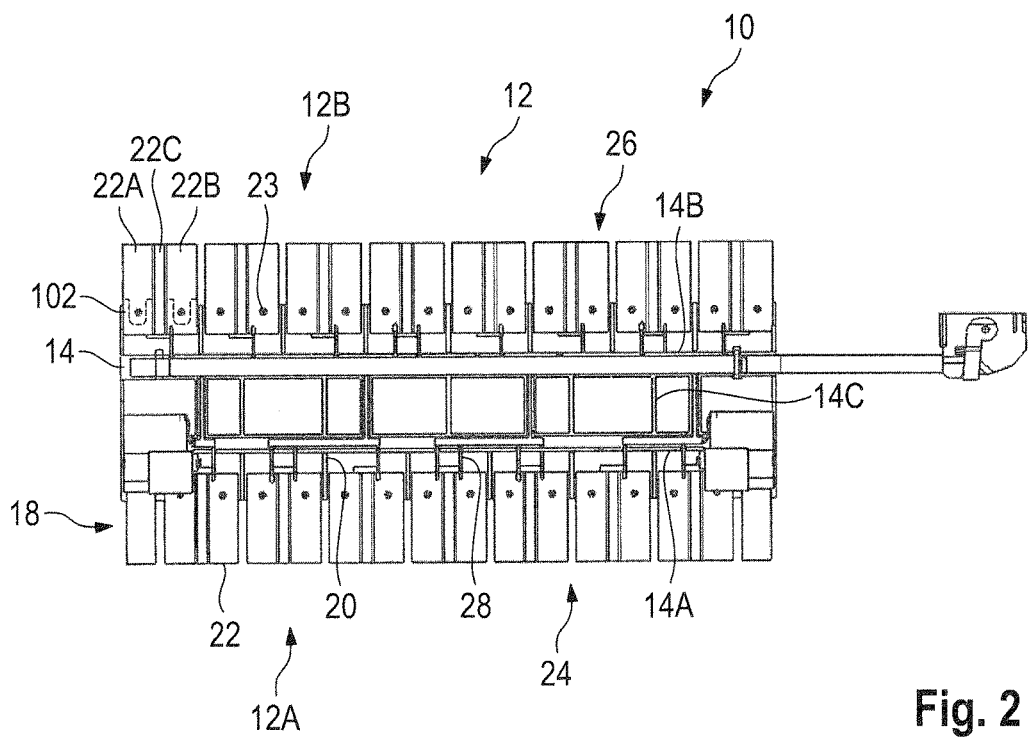
FIG. 2 is a plan view of the cell contact-making system from FIG. 1.

FIGS. 1 and 2 show a perspective view and a plan view of a cell contact-making system 10 for a motor-vehicle battery module, not illustrated here, which has a substantially plate-like support structure 12. The motor-vehicle battery module will be explained later with the aid of FIG. 3.

The support structure 12 comprises a centrally arranged web 14 which, in the embodiment shown, has two channel-shaped sections 14A, 14B which are connected to one another by way of transverse struts 14C in order to form the web 14 and therefore the support structure 12 in a torsionally rigid manner and with a higher degree of mechanical stiffness. Therefore, a ladder or lattice structure is produced.

A respective supporting element 16, which in each case includes a plurality of supporting sections 18, protrudes from the centrally arranged web 14 on opposite sides 12A, 12B of the support structure 12. In the embodiment shown, the supporting elements 16 are in the form of continuous, substantially plate-shaped elements which extend over the entire length of the centrally arranged web 14.

The individual supporting sections 18 are connected to one another by ribs 20 which are provided on the supporting elements 16. The ribs 20 provide the supporting elements 16 with a higher degree of mechanical rigidity.

In each case one contact element 22 is fastened to a supporting section 18. The contact element lies partially on the corresponding supporting section 18. The contact elements 22 each have substantially two plate-like contact sections 22A, 22B and also a compensation bow 22C which mechanically and electrically connects the two contact sections 22A, 22B to one another. The contact elements 22 are of substantially mirror-symmetrical design with respect to the center axis of the compensation bow 22C.

The contact elements 22 are connected to the support structure 12, in particular to the supporting sections 18, by way of the contact sections 22A, 22B, specifically in each case by an edge-side connecting point 23, for example by way of a weld point.

The contact elements 22 generally protrude beyond the support structure 12, in particular beyond the supporting elements 16 and, respectively, the supporting sections 18. Since the contact elements 22 are fastened to the support structure 12 only on one side, the contact elements 22 are movable in a resilient manner by way of their freely projecting, protruding section, so that the contact elements 22 have a certain degree of play and, respectively, a certain degree of flexibility.

It is clear from the plan view in FIG. 2 that the contact elements 22 lie on the supporting elements 16 and the supporting sections 18 only by way of a portion of less than 50%. The remaining portion of the contact elements 22 therefore protrudes laterally from the support structure 12 and can generally be moved perpendicularly in relation to the orientation of the contact elements 22.

Overall, a plurality of contact elements 22 are provided, said contact elements forming a first row 24 and also a second row 26 of contact elements 22 which are provided on the opposite sides 12A, 12B of the support structure 12.

Battery cells 34, indicated symbolically in FIG. 1, of the motor-vehicle battery module are connected to one another in series by use of the respective contact elements 22. To this end, the contact elements 22 of both rows 24, 26 are arranged offset in relation to one another by half the width of a contact element 22 in the row direction, so that a contact element 22 of the first row 24 connects a first pole of a first battery cell 34 to a second pole of a second battery cell 34, whereas a substantially opposite contact element 22 of the second row 26 connects a first pole of the second battery cell 34 to a second pole of a third battery cell 34. As a result, all of the battery cells 34 of the battery module can be connected in series.

It is further clear from FIGS. 1 and 2 that the individual contact elements 22 are interconnected by way of cables 28, wherein the cables 28 converge at the web 14, so that the web 14 forms a cable channel. Therefore, the support structure 12 generally provides the bearing structure of the contact elements 22 and also the guide structure of the cable 28, as a result of which the support structure 12 simultaneous has two functions and a separate cable channel cable support can be eliminated.

As an alternative to the embodiment shown, the individual supporting sections 18 can have fastening tabs 102 (see FIG. 2) which protrude beyond the supporting elements 16. The fastening tabs 102 can likewise be of movable or at least flexible design, as a result of which a greater degree of flexibility is achieved. Furthermore, the fastening tabs can form a bearing surface for the contact elements 22.

Figure 3:
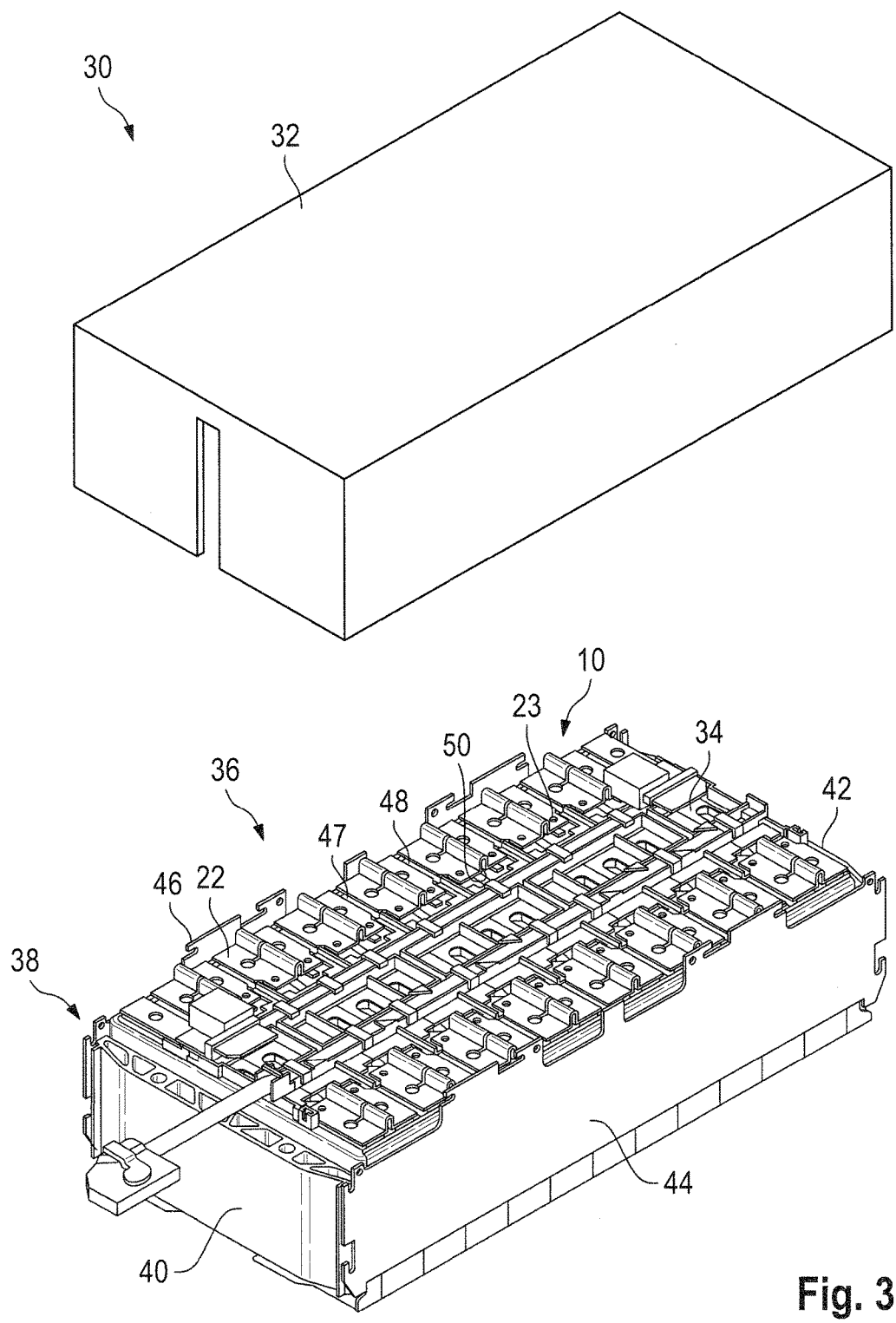
FIG. 3 is a perspective illustration of the motor-vehicle battery module according to an embodiment of the invention.

FIG. 3 shows a motor-vehicle battery module 30, in which a cover 32 is illustrated separately from the rest of the motor-vehicle battery module in the figure.

In general, the motor-vehicle battery module 30 includes a plurality of, in particular prismatic, battery cells 34 which are situated flat next to one another and form a battery pack 36.

The battery pack 36 is surrounded about its circumference by a module frame 38 which has two pressure plates 40, 42 which are arranged on opposite sides of the battery pack 36. The pressure plates 40, 42 each bear flat against a side surface of an edge-side battery cell 34 of the battery pack 36.

Furthermore, the module frame 38 includes two tie rods 44, 46 which are connected to the two pressure plates 40, 42 and likewise bear against opposite sides of the battery pack 36. The tie rods 44, 46 extend over all of the end sides of the battery cells 34 in this case.

During production, the battery cells 34 are compressed by the pressure plates 40, 42 with distance and/or force control or distance and/or force regulation in order to form the battery pack 36. The pressure plates 40, 42 are then connected to the tension rods 44, 46 in order to ensure that the battery pack 36 is kept in its defined form.

Furthermore, the motor-vehicle battery module 30 includes a cell contact-making system 10 which, however, in the embodiment shown in FIG. 3 differs from the embodiment shown in FIGS. 1 and 2, wherein, however, the system according to FIGS. 1 and 2 would be applicable.

The difference between the two embodiments of the cell contact-making system 10 can be found in the design of the supporting sections 18 which, in the embodiment of the cell contact-making system 10 shown in FIG. 3, has the above-mentioned fastening tabs 47 which are indicated as alternatives in FIG. 2.

In the embodiment of the cell contact-making system 10 shown in FIG. 3, the fastening tabs 47 are each formed in such a way that they have two bearing sections 48 which face away orthogonally from the centrally arranged web 14 and on which the corresponding contact element 22 bears by way of its lateral edges which face away orthogonally from the fastened edge. A fastening section 50 which transversely connects the two bearing sections 48 is formed between the two bearing sections 48, said fastening section extending substantially parallel in relation to the centrally arranged web 14.

The shape of the fastening tabs 47 is approximately H-shaped, wherein the transversely running web is not arranged centrally. The fastening section 50 corresponds to the transversely running web of the "H".

The contact elements 22 are correspondingly fastened to the fastening sections 50 on one side by way of the connecting points 23. As already described, the contact elements 22 are each fastened to the fastening section 50 only by way of an edge region, so that the opposite region of the contact elements 22 is freely movable.

As is now clearly illustrated in FIG. 3, the battery cells 34 can expand at least partially without interference since the free regions of the contact elements 22 yield to an expansion of the battery cells 34. The outside edges of the contact elements 22 would be pushed upward or in the z-direction in accordance with the expanding battery cells 34.

If the battery cells 34 were to relax or return to their original shape again, the contact elements 22 would likewise move back to their original position, so that they bear on the supporting sections 16 and, respectively, the fastening tabs 47, in particular on the bearing sections 48 which can each extend as far as the outer edges of the contact elements 22.

In order to close the motor-vehicle battery module 30, the cover 32 is placed over the module frame 38 and the battery pack 36 which is surrounded by the module frame, so that the cover also covers the cell contact-making system 10. The cover 32 is fastened to the module frame 38, in particular to at least one of the pressure plates 40, 42 and/or at least one of the tie rods 44, 46, as a result of which the cover is decoupled from the cell contact-making system 10. Manufacturing-related tolerances of the cell contact-making system 10 accordingly have absolutely no effect on the fit of the cover 32.

As an alternative, the cover 32 can also be fastened to both pressure plates 40, 42 and also both tie rods 44, 46 in order to guarantee defined positioning of the cover 32.

In particular, the cover 32 can be latched to the module frame 38, so that the cover 32 is connected to the motor-vehicle battery module 30 in a simple manner since the cover 32 is merely pushed down and then automatically latches in.

The cover 32 can be formed from an electrically insulating material, so that the cover 32 simultaneously provides, or at least partially forms, the high-voltage insulation of the motor-vehicle battery module 30. The electrically insulating material may be, for example, an appropriate plastic, so that the motor-vehicle battery module 30 which is produced in such a way has a low weight.

As a result, the air gaps and creepage distances of the motor-vehicle battery module 10 can be maintained more easily since the cover 32 which is composed of an insulating material is fastened directly to the insulating module frame 38 or the module frame 38 which is insulated from the battery pack 36.

Furthermore, the cover 32 can be in the form of a thermoformed cover, as a result of which it can be produced in a particularly rapid and simple manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cell contact-making system of a motor vehicle battery module, comprising:
   a substantially plate-shaped support structure;
   a plurality of separate contact elements each of which is disposed partially on and is fastened to the support structure on a first side, wherein each of the plurality of separate contact elements comprises a freely projecting side opposite the first side that protrudes beyond an edge of the support structure, each of which is used to contact two adjacent battery cells of the motor vehicle battery module, wherein
   the contact elements are arranged next to one another in a first row, each contact element being fixed at one side to the support structure,
   the support structure has a plurality of supporting sections which protrude laterally in relation to the battery cells to form an edge of the support structure, and
   each of the contact elements are fastened to a corresponding one of the supporting sections.

2. The cell contact-making system according to claim 1, wherein
   a total width of the support structure with the contact elements fastened thereon corresponds to a width of a battery pack formed by battery cells of the motor vehicle battery module.

3. The cell contact-making system according to claim 1, wherein
   the support structure has a web where the supporting sections protrude laterally in relation to the battery cells from the web,
   the web is arranged substantially centrally and extends along the first row of the contact elements.

4. The cell contact-making system according to claim 3, wherein each supporting section has a fastening tab to which a respective contact element is fastened.

5. The cell contact-making system according to claim 2, wherein
   the support structure has a web where the supporting sections protrude laterally in relation to the battery cells from the web,
   the web is arranged substantially centrally and extends along the first row of the contact elements.

6. The cell contact-making system according to claim 1, further comprising:
   further contact elements arranged next to one another in a second row, each further contact element being used to contact two adjacent battery cells of the motor vehicle battery module, wherein
   the second row is arranged opposite the first row so that contact elements are positioned on both sides of the support structure, and
   the contact elements of the first and second rows are arranged offset in relation to one another by half a width of a contact element in the row direction.

7. The cell contact-making system according to claim 2, further comprising:
   further contact elements arranged next to one another in a second row, each further contact element being used to contact two adjacent battery cells of the motor vehicle battery module, wherein
   the second row is arranged opposite the first row so that contact elements are positioned on both sides of the support structure, and
   the contact elements of the first and second rows are arranged offset in relation to one another by half a width of a contact element in the row direction.

8. The cell contact-making system according to claim 3, further comprising:
   further contact elements arranged next to one another in a second row, each further contact element being used to contact two adjacent battery cells of the motor vehicle battery module, wherein
   the second row is arranged opposite the first row so that contact elements are positioned on both sides of the support structure, and
   the contact elements of the first and second rows are arranged offset in relation to one another by half a width of a contact element in the row direction.

9. The cell contact-making system according to claim 4, further comprising:
   further contact elements arranged next to one another in a second row, each further contact element being used to contact two adjacent battery cells of the motor vehicle battery module, wherein
   the second row is arranged opposite the first row so that contact elements are positioned on both sides of the support structure, and
   the contact elements of the first and second rows are arranged offset in relation to one another by half a width of a contact element in the row direction.

10. The cell contact-making system according to claim 1, wherein the motor vehicle battery module is for an electric or hybrid vehicle.

11. A motor vehicle battery module, comprising:
   at least two battery cells arranged flat next to one another and forming a battery pack;
   a module frame circumferentially surrounding the at least two battery cells; and
   the cell contact-making system according to claim 1.

12. The motor vehicle battery module according to claim 11, wherein the motor vehicle battery module is configured for an electric or hybrid vehicle and includes at least two prismatic battery cells.

13. The motor vehicle battery module according to claim 11, further comprising a cover configured to cover the cell contact-making system.

14. The motor vehicle battery module according to claim 13, wherein the cover is fastened to the module frame.

15. A motor vehicle battery module, comprising:
- at least two battery cells arranged flat next to one another forming a battery pack;
- a module frame circumferentially surrounding the at least two battery cells;
- the cell contact-making system of claim 1 electrically connecting the battery cells of the motor vehicle battery module to one another; and
- a cover, separate from the cell contact-making system, configured to cover the cell contact-making system and being fastened to the module frame while being decoupled from the cell contact-making system.

16. The motor vehicle battery module according to claim 15, wherein the battery module is for an electric or hybrid vehicle and includes at least two prismatic battery cells, and further wherein the cover is latched to the module frame.

17. The motor vehicle battery module according to claim 15, wherein the module frame comprises two pressure plates that bear against opposite sides of the battery pack, and two tie rods that are connected to the two pressure plates, wherein the cover is fastened to at least one pressure plate and to at least one tie rod.

18. The motor vehicle battery module according to claim 14, wherein the module frame comprises two pressure plates that bear against opposite sides of the battery pack, and two tie rods that are connected to the two pressure plates, wherein the cover is fastened to at least one pressure plate and to at least one tie rod.

19. The motor vehicle battery module according to claim 11, wherein the cover is a thermoformed cover and/or is made from an electrically insulating material.

20. The motor vehicle battery module according to claim 15, wherein the cover is a thermoformed cover and/or is made from an electrically insulating material.

* * * * *